United States Patent
Piko

[15] 3,651,833
[45] Mar. 28, 1972

[54] ELECTROMAGNETIC VALVE
[72] Inventor: Zoltan Piko, Budapest, Hungary
[73] Assignee: Medicor Muvek, Budapest, Hungary
[22] Filed: May 8, 1970
[21] Appl. No.: 35,706

[30] Foreign Application Priority Data
May 12, 1969 Hungary ..................ME-1059

[52] U.S. Cl....................137/625.65, 251/141, 137/625.33
[51] Int. Cl.......................................F16k 11/06, F16k 31/08
[58] Field of Search.................137/625.65, 625.27, 625.33, 137/602, 625.4; 251/141, 139, 30, 140, 129, 332

[56] References Cited

UNITED STATES PATENTS

| | | | |
|---|---|---|---|
| 2,614,584 | 10/1952 | Goeffrich | 251/139 |
| 3,324,889 | 6/1967 | Batts | 251/139 X |
| 3,043,336 | 7/1962 | Parent et al. | 251/139 X |
| 3,377,046 | 4/1968 | Frantz et al. | 251/139 |
| 2,624,585 | 1/1953 | Churchill et al. | 251/30 X |
| 3,368,788 | 2/1968 | Padula | 251/141 X |
| 3,379,214 | 4/1968 | Weinberg | 251/141 X |
| 3,484,076 | 12/1969 | Naumann | 251/141 |
| 2,491,905 | 12/1949 | Ray | 251/129 X |
| 665,357 | 1/1901 | Ackerman | 137/625.4 |
| 3,444,895 | 5/1969 | Schnittker | 137/625.65 |

FOREIGN PATENTS OR APPLICATIONS

| | | | |
|---|---|---|---|
| 853,822 | 11/1938 | France | 251/129 |

Primary Examiner—M. Cary Nelson
Assistant Examiner—Robert J. Miller
Attorney—Young and Thompson

[57] ABSTRACT

An electromagnetic valve has a valve member which is a core movable within a winding. The core remains deep in the winding and is spaced laterally from the interior of the winding and has a beveled seat where it emerges from the winding that engages with a beveled surface on the winding to locate the core in a closed position. The core has resilient valve seats at opposite ends to permit fluid switching, as in a logic circuit, with low amplitude of movement and with high sensitivity.

4 Claims, 4 Drawing Figures

INVENTOR
ZOLTÁN PIKÓ

BY Young + Thompson

ATTORNEYS

ELECTROMAGNETIC VALVE

The present invention relates to electromagnetic valves, more particularly of the type in which the core of an electromagnet serves as the valve member to open and close fluid passageways that are coaxial with the coil.

Although the present invention is applicable to a wide variety of electromagnetically operated valves, it has particular utility in the field of automated electropneumatic systems, such as logic systems and the like. In recent years, numerous devices of this type have been proposed, but the greater part have been for use in high pressure systems where the controlling factors are safety rather than volume or control power requirements. In known devices, the construction is the same whether the devices are large or small, so that even the small valves have a slow operation and low efficiency and are not readily adaptable to portable equipment. Also, such valves do not operate well at low pressures.

Accordingly, it is an object of the present invention to provide electromagnetic valves which can be of small dimension and have very rapid operation at low power with high efficiency.

Another object of the present invention is to provide electromagnetic valves that are readily adaptable to portable installations.

Still another object of the present invention is the provision of electromagnetic valves having low frictional and magnetic losses, in all positions of use.

Finally, it is an object of the present invention to provide electromagnetic valves which will be relatively simple and inexpensive to manufacture, easy to install, operate, maintain and repair, and rugged and durable in use.

Other objects, features and advantages of the present invention will become apparent from a consideration of the following description, taken in connection with the accompanying drawing, in which.

Figure 1:
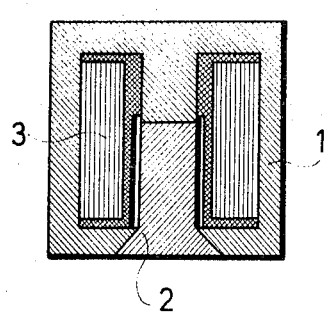
FIG. 1 is a cross-sectional view of an uncompleted valve according to the present invention.
Figure 2:
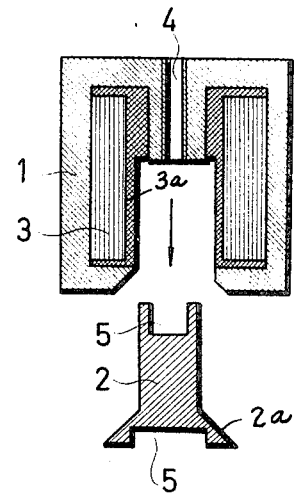
FIG. 2 is a view similar to FIG. 1 but showing further steps in the construction of the valve.

Referring now to the drawing in greater detail, an electromagnetically controlled valve comprising an electromagnet 1 has a core 2 of magnetic material such as iron movable axially therein under the influence of a field coil or winding 3. It should be noted that winding 3 has an internal spool-shaped casing 3a that is recessed to receive core 2 with substantial radial clearance. Winding 3 of course has the usual electrical connections (not shown). The casing of magnet 1 has a central boss that snugly fits within casing 3a and that has an axial opening 4 therethrough which serves as an outlet opening for the valve.

At its outer end, which is the lower end in the drawing, the core 2 has an endwise outwardly tapered portion 2a that fits within a correspondingly tapered portion of the body of magnet 1, thereby to maintain core 2 axially aligned with the valve body when core 2 is fully within magnet 1, that is, in its uppermost position as seen in the drawing. These complementary tapered surfaces, which are preferably conical, thus center the valve core without lateral sliding friction and without the need for any contact between core 2 and casing 3a.

At its opposite ends, core 2 is provided with recesses 5 in which are disposed elastic deformable sealing members 7 and 8. Preferably, member 7 is of substantially greater radial extent than member 8, for a purpose which will be described later. Member 8 seals opening 4; and for this purpose, opening 4 may be provided with an insert 6 that provides a valve seat inside magnet 1 and a coupling outside magnet 1.

The valve body the principal portion of which is defined by magnet 1 is closed by a cover plate 9 of non-magnetic material, which is axially pierced by an outlet opening 10 and which has a lateral inlet fitting 11.

Figure 4:
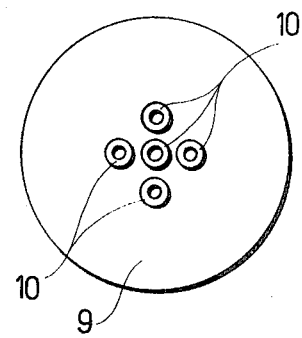
FIG. 4 is an exterior end view of a modified form of valve according to the present invention.

In FIG. 4, a variation is shown in which the number of outlet openings 10 is multiplied. It will accordingly be recognized that the larger size of member 7 relative to member 8 is useful for covering a plurality of such openings. It will also be understood that the larger bottom area of core 2 provided by tapered portion 2a enables this result.

In operation, when magnet 1 is energized, core 2 will be in the uppermost position shown in the drawing, and member 8 will close outlet opening 6. But when magnet 1 is deenergized, then core 2 will be in the lowermost position and member 7 will close outlet opening or openings 10. The pressure of fluid entering through fitting 11 will of course augment the sealing effect of core 2 in either position; and the movement of core 2 between these two positions will be even more positive if the fluid flow, as in certain logic circuits, is pulsed.

Figure 3:
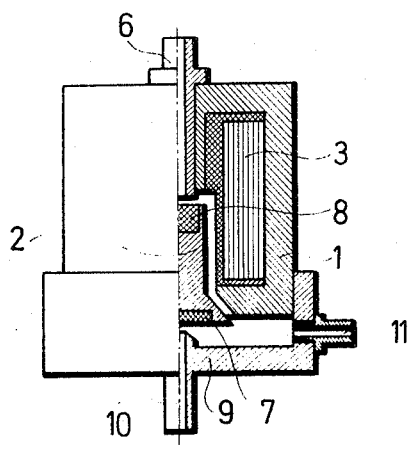
FIG. 3 is a half cross-sectional, half elevational view similar to FIGS. 1 and 2 but showing the completed valve.

It will also be recognized that the recessing of the casing 3a not only avoids friction with core 2, but also provides a fluid passageway when magnet 1 is de-energized and the opening 4 is exposed as in FIG. 3.

It will further be recognized that the path of movement of core 2 between its extreme positions is very short and that in any event core 2 is always disposed deep within winding 3, so that the movement of core 2 upon energization of magnet 1 will be immediate and positive even at very low power. The present invention thus provides extremely sensitive and rapid operation of a valve at very low power and with an absolute minimum of friction so that friction loss and power loss are very small.

Finally, it will be recognized that the valve described above is admirably adapted to embodiment in a miniature size of very low weight.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. An electromagnetic valve comprising an electromagnet having two ends and having a winding surrounding an axial recess in the electromagnet, a core movable coaxially within the recess, the magnet having an opening coaxially through one of said ends, said core in one position having one end that closes said opening and an opposite end that is disposed in the mouth of said recess at said other end of the electromagnet, a non-magnetic cover plate that closes the valve and which defines with the electromagnet a valve body within which the core is disposed, and a fluid inlet into the valve body, said core being spaced radially inwardly from said winding, said mouth of said recess having an endwise outward taper that contacts a complementary endwise outward taper on said opposite end of said core in said one position of said core.

2. A valve as claimed in claim 1, said inlet extending through said cover plate.

3. A valve as claimed in claim 1, and an opening through said cover plate which is closed by the core when the core is in a position other than said one position.

4. A valve as claimed in claim 1, said cover plate having a plurality of openings therethrough that are closed by the core when the core is in a position other than said one position.

* * * * *